US005279692A

United States Patent [19]

Best et al.

[11] Patent Number: 5,279,692

[45] Date of Patent: Jan. 18, 1994

[54] PHOTOGRAPHIC FRAME ASSEMBLY

[75] Inventors: Scott D. Best, Troy; James F. Turner, Farmington Hills, both of Mich.

[73] Assignee: Saxon, Inc., Ferndale, Mich.

[21] Appl. No.: 1,329

[22] Filed: Jan. 7, 1993

Related U.S. Application Data

[62] Division of Ser. No. 871,072, Apr. 20, 1992, Pat. No. 5,201,133.

[51] Int. Cl.$^5$ .............................................. B32B 31/00

[52] U.S. Cl. .................................. 156/268; 40/152.1; 40/158.1; 156/257; 428/41

[58] Field of Search ........................... 428/41, 45, 138; 156/257, 268; 40/158.1, 152.1, 124.4, 360, 630

[56] References Cited

U.S. PATENT DOCUMENTS

| | | | |
|---|---|---|---|
| 687,411 | 11/1901 | Stuparich | 40/158.1 |
| 2,061,294 | 11/1936 | Stephenson | 40/125 |
| 2,844,901 | 7/1958 | Eisen | 40/158.1 |
| 2,867,927 | 1/1959 | Schwartz | 40/158 |
| 3,879,874 | 4/1975 | Broussard, Sr. | 40/158.1 |
| 4,057,923 | 11/1977 | Chase | 40/158 R |
| 4,231,833 | 11/1980 | Lieberman | 156/249 |
| 4,332,095 | 6/1982 | Tanney | 40/158 R |
| 4,640,030 | 2/1987 | Wood et al. | 40/158 R |
| 4,741,119 | 5/1988 | Baryla | 40/594 |
| 4,761,903 | 8/1988 | Cantrell | 40/159 |
| 4,777,746 | 10/1988 | Brooks | 40/152.1 |
| 4,809,451 | 3/1989 | Suzuki | 40/158.1 |
| 4,825,574 | 5/1989 | George | 40/158.1 |
| 4,831,756 | 5/1989 | Huang et al. | 40/158.1 |
| 4,864,755 | 9/1989 | Owens | 40/594 |
| 4,914,842 | 4/1990 | Lieberman | 40/158.1 |
| 4,947,566 | 8/1990 | Hoebel | 40/158.1 |
| 4,953,780 | 9/1990 | Ross | 229/92.8 |
| 5,032,436 | 7/1991 | Gustafson | 428/14 |

*Primary Examiner*—David A. Simmons
*Assistant Examiner*—Paul M. Rivard
*Attorney, Agent, or Firm*—Reising, Ethington, Barnard, Perry & Milton

[57] ABSTRACT

A frame sheet (24) provides a frame which surrounds and supports a photograph (22). The frame sheet (24) includes a border section (40) with a center section (48) which is surrounded by the border section (40). The center section (48) is removable from the border section such that an adhesive (46) is exposed on a back surface (36) of the border section (40) for holding a margin (30) of the photograph (22). The border section (40) surrounds and supports the photograph (22) while the removable center section (48) can be secured on the rear surface (28) of the photograph (22) for providing additional support for the photograph (22).

8 Claims, 4 Drawing Sheets

PHOTOGRAPHIC FRAME ASSEMBLY

This is a division of application Ser. No. 07/871,072 filed Apr. 20, 1992 now U.S. Pat. No. 5,201,133.

TECHNICAL FIELD

The present invention relates to inexpensive frames of paper and polymeric materials for use with photographs and the like.

BACKGROUND OF THE INVENTION

Inexpensive frames of paper and polymeric materials, including adhesives, for use with photographs and the like are well known in the art. U.S. Pat. Nos. 5,032,436, 4,914,842, 4,777,746 and 4,231,833 are illustrative examples. However, these frames are generally produced from more than one layer, thereby increasing the expense. Further these frames do not hold the photograph rigidly erect for display without additional layers of material, or a separate mat, thereby increasing the cost. Those frames that require a separate mat must be properly packaged so that the mat and frame do not become separated, further increasing costs. This increases the costs to such a degree that it becomes impractical to include the frame in packages of developed prints as an inducement to use a particular film developer's service.

SUMMARY OF THE INVENTION AND ADVANTAGES

The present invention is a frame sheet article for displaying a photograph including a front surface and a back surface. The frame sheet further includes a border section which defines a center section, that is the center section is surrounded by the border section. An adhesive is disposed on the back surface with a single removable backing sheet covering the adhesive. The backing sheet includes a middle portion larger than the center section which defines an inner margin on said back surface. The frame sheet is characterized by release means for allowing removal of both the center section from within the border section and the middle portion to expose a border adhesive on the back surface of the inner margin of the border section for holding a margin of the photograph.

The present invention provides a frame for the display of photographs which is formed in one sheet and is therefore inexpensive to produce. The frame sheet article further provides for the removed center section to be able to be secured on the rear surface of the photograph for maintaining the photograph rigid enough to be displayed in an erect position. Additionally, because it is one sheet it does not require separate packaging to hold multiple loose sheets or mats together, further reducing costs and making it compact enough to be included in envelopes of developed prints.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
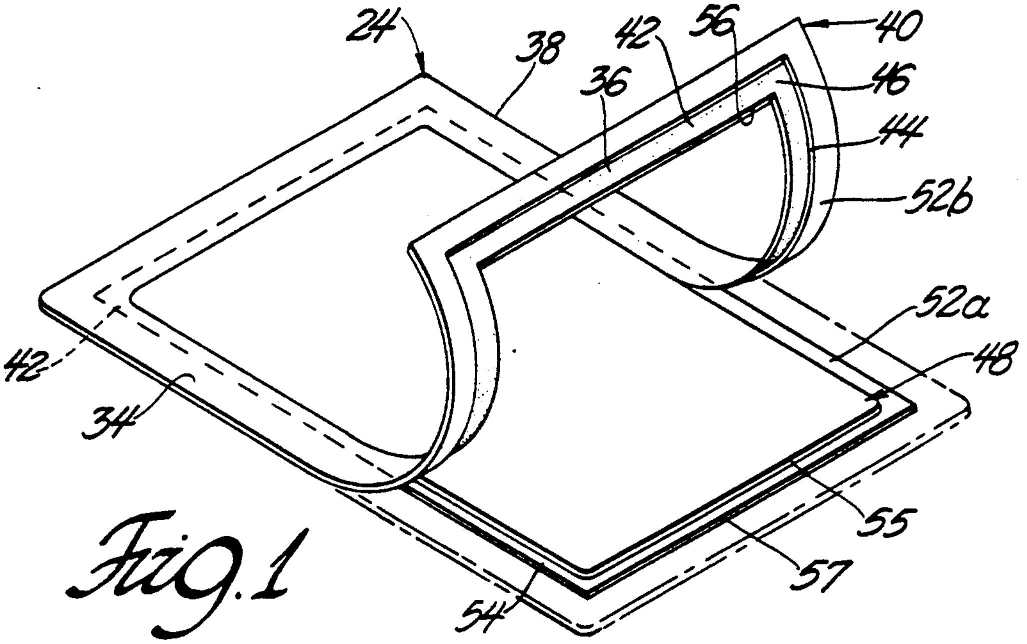
FIG. 1 is a perspective view of a photograph frame assembly according to the instant invention with the front layer partially peeled back.

Referring to the Figures, a photographic frame assembly constructed in accordance with the instant invention is generally shown at 20. The photographic frame assembly 20 surrounds and supports a photograph generally shown at 22. The photograph 22 includes a pictorial face 26 and a rear surface 28 opposite the pictorial face 26. The pictorial face 26 includes a margin 30 surrounding a central viewing area 32. The margin 30 may be defined by a border distinct from the pictorial face 26, or simply by the peripheral edges of the photograph 22.

Figure 5:
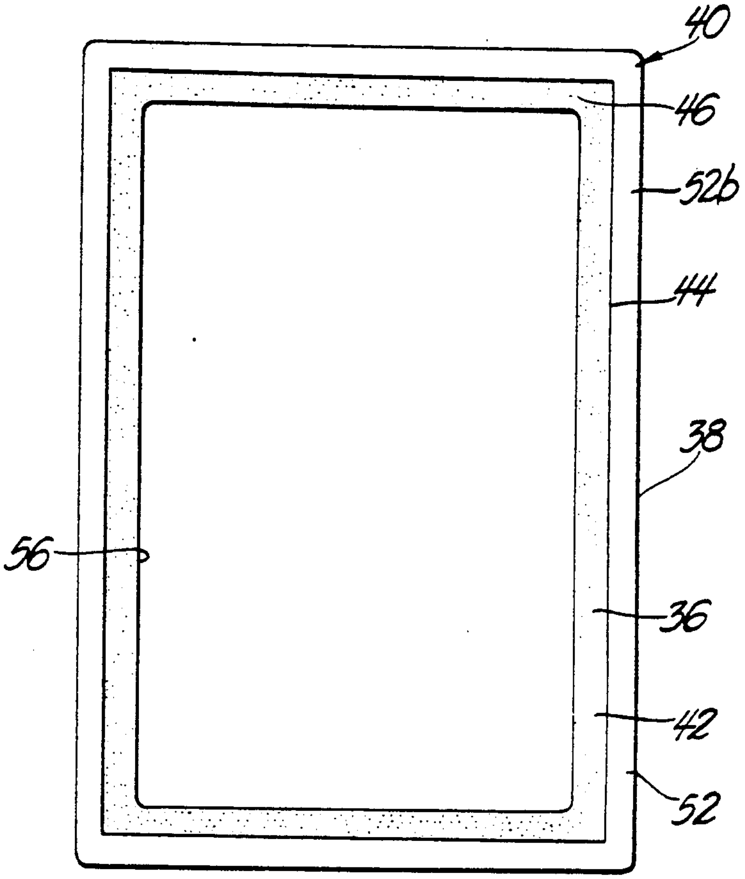
FIG. 5 is a rear view taken substantially along line 5—5 of FIG. 4.

The photographic frame assembly 20 includes a frame sheet 24 fabricated from a cellulose fiber material and has a front surface 34 with a back surface 36 opposite the front surface 34 and an outer edge 38. In the preferred embodiment, the frame sheet 24 is fabricated from 130 pound tag stock overlaminated with polypropylene laminate with a 60 pound machine finished liner. The frame sheet 24 further includes a border section 40 extending completely around the frame sheet 24. The border section 40 includes an inner margin 42. The border section 40 extends inwardly from the outer edge 38 through the inner margin 42. The inner margin 42 has an outer perimeter 44 that generally delineates the boundary of the inner margin 42 within the border section 40. A border adhesive 46 is disposed on the back surface 36 of the border section 40 as best shown in FIGS. 1 and 5. The border section 40 could have a color such that the border section 40 presents a colored appearance.

Figure 2:
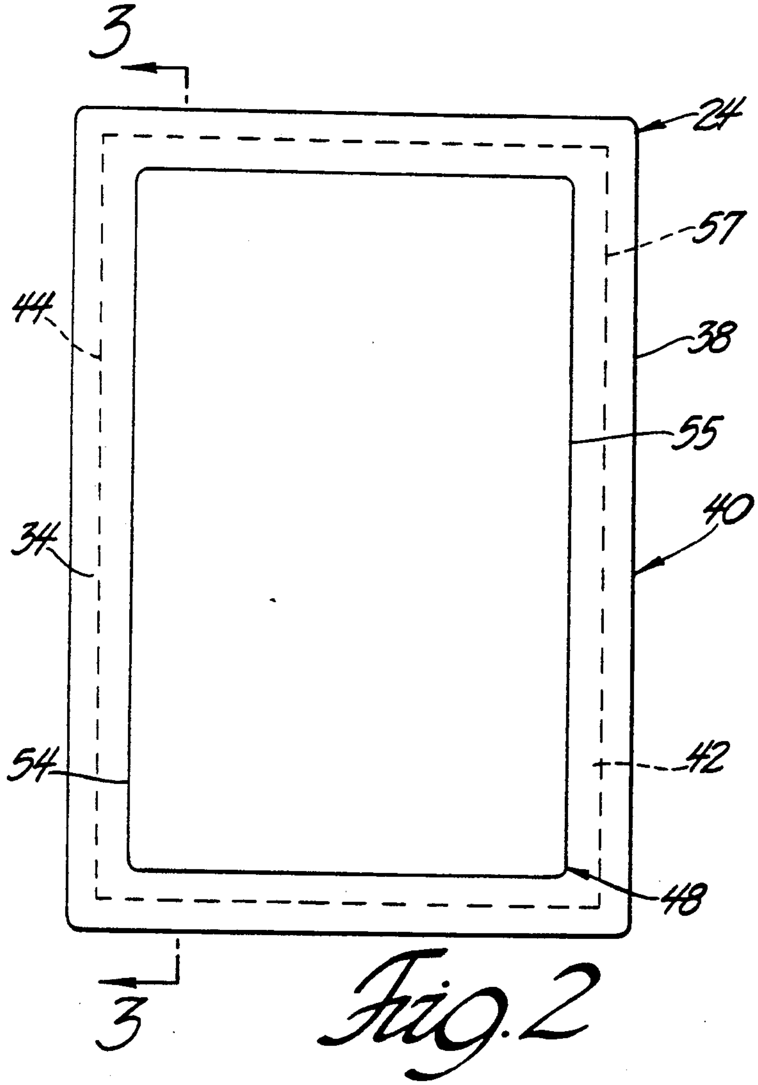
FIG. 2 is a front view of a photograph frame assembly according to the instant invention prior to assembly.
Figure 3:
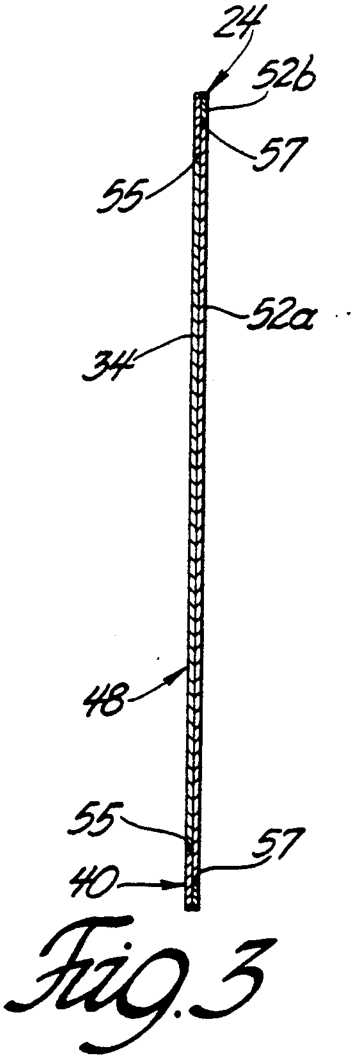
FIG. 3 is a cross-sectional view taken substantially along line 3—3 of FIG. 2.

The frame sheet 24 includes a center section, generally indicated at 48, that is disposed within the border section 40 and is defined by the border section 40 as is best shown in FIGS. 1 and 2. In other words, the center section 48 is surrounded by the border section 40. A center adhesive 50 covers the entire back surface 36 of the center section 48 as best shown in FIG. 7. The border adhesive 46 and center adhesive 50 are co-extensive, that is they are applied as a single adhesive layer. The adhesive used in the preferred embodiment is a special release permanent AT-1 adhesive on the 60 pound machine finish liner. A single removable backing sheet 52 is disposed on the border adhesive 46 and center adhesive 50. The backing sheet 52 covers the entire back surface 36 of the frame sheet 24 and is best shown in FIGS. 1, 4 and 6.

A release means 54 is provided for removing the center section 48 from within the border section 40. That is, the center section 48 can be removed from the frame sheet 24 due to the release means 54. When the center section 48 is removed from the frame sheet 24, an empty viewing region 56 is formed surrounded by the border section 48 as best shown in FIGS. 4 and 5. The viewing region 56 corresponds in size to the central viewing area 32 of the photograph 22.

The release means 54 includes a first die cut 55 between the center section 48 and the border section 40 from the front surface 34 to the back surface 36 that is, up to but not through the removable backing sheet 52. In other words the first die cut 55 extends through the frame sheet 24, but not the backing sheet 52. The first die cut 55 is made at the boundary between the center section 48 and the border section 40. The release means 54 further includes a second die cut 57 through the removable backing sheet 52 along the outer perimeter 44 of the inner margin 42 defining a middle portion **52*a* of the removable backing sheet 52 larger than the center section 48. The second die cut 57 does not go through the frame sheet. The first 55 and second 57 die cuts are spaced from each other, such that they define the inner margin 42 on the back surface 36 of the border section 40**.

Figure 4:
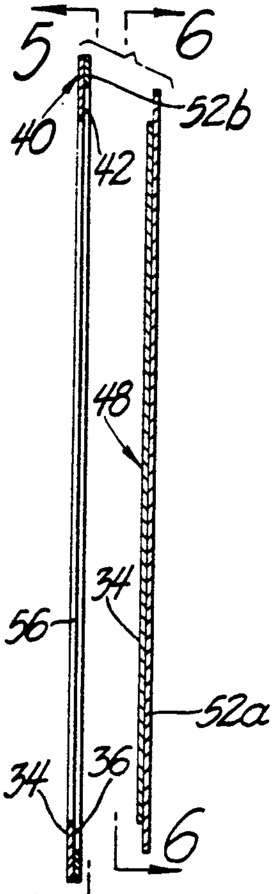
FIG. 4 is a cross-sectional view as in FIG. 3 showing the border section and a portion of the backing sheet exploded from the center section and the remainder of the backing sheet.
Figure 6:
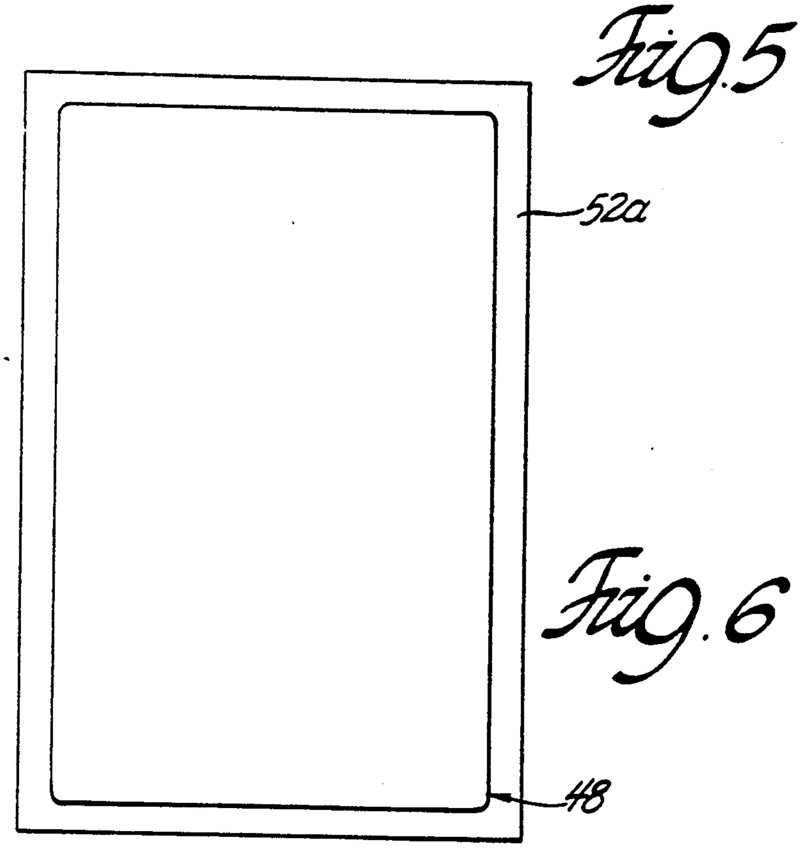
FIG. 6 is a front view taken substantially along line 6—6 of FIG. 4.
Figure 7:
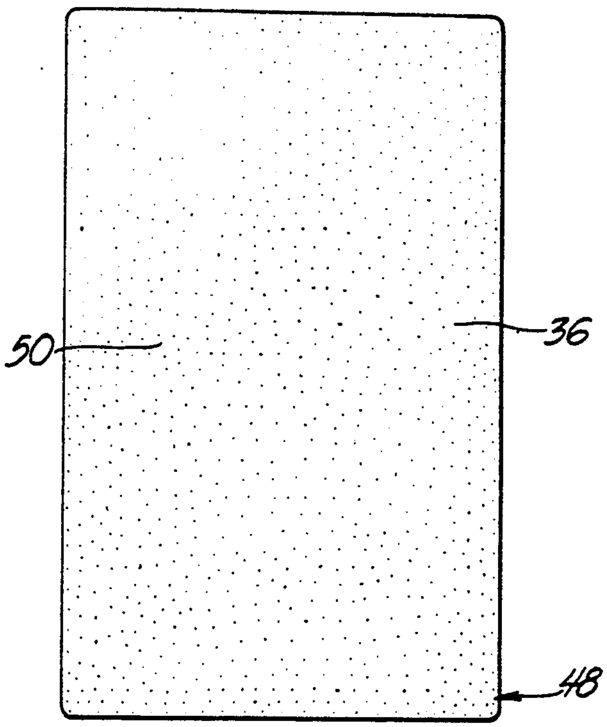
FIG. 7 is a rear view of the center section of FIG. 6 showing an adhesive layer exposed.
Figure 10:
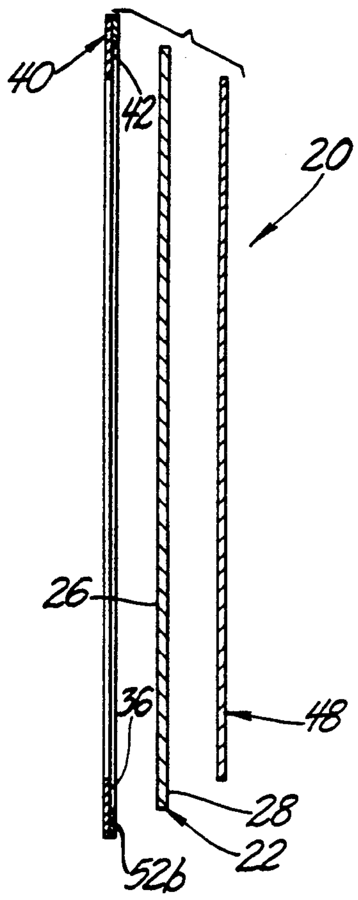
FIG. 10 is a cross-sectional view as in FIG. 9 showing the border section and a portion of the backing sheet exploded from the photograph and center section.
Figure 9:
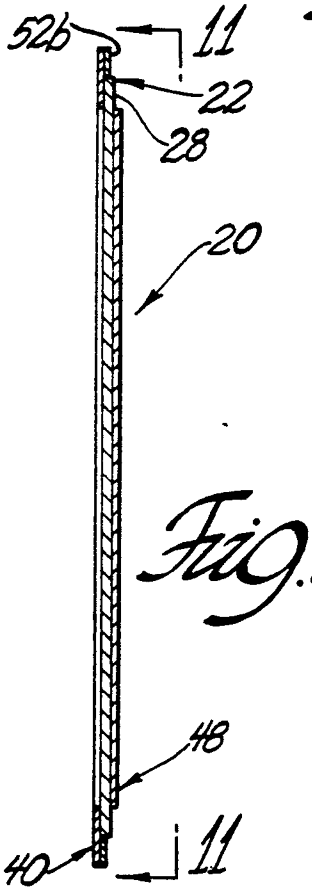
FIG. 9 is a cross-sectional view taken substantially along line 9—9 of FIG. 8.

The release means 54 additionally provides for removing the center section 48 with the middle portion **52*a* of the backing sheet 52 still attached as best shown in FIGS. 4 and 6. The middle portion 52*a* extends beyond the center section 48 and first die cut 55 only to the second die cut 57. Therefore removal of the center section 48 with the middle portion 52*a* of the backing sheet 52 attached exposes the border adhesive 46 on the back surface 36 of the inner margin 42. A remainder of the backing sheet 52*b*, from the second die cut 57 to the outer edge 38, remains on the back surface 36 of the border section 40 thereby not exposing the rest of the border adhesive 46. The remainder 52*b* forms a guide into which to place the photograph 22 and orientate the photograph such that the central viewing area 32 of the photograph 22 is aligned with the viewing region 56 of the frame sheet 24**.

When the photograph frame assembly 20 is assembled, the border section 40 of the frame sheet 24 overlaps the margin 30 on the pictorial face 26 of the photograph 22 thereby surrounding the central viewing area 32 of the photograph 22. The central viewing area 32 is visible in the viewing region 56 of the frame sheet 24. The center adhesive 50, disposed on the back surface 36 of the center section 48, is exposed by removal of the middle portion **52*a* of the backing sheet 52 after the center section 48 is released from the frame sheet 24. The center section 48 is thereby secured on the rear surface 28 of the photograph 22 for maintaining the photograph 22 rigid enough to be displayed in an erect position. The back surface 36 of the center section 48 is adjacent to the rear surface 28 of the photograph 22** after being secured.

Figure 13:
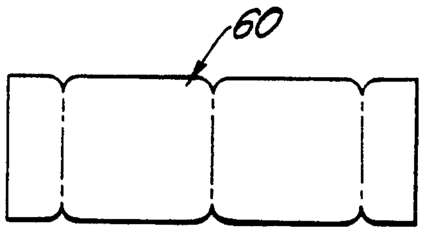
FIG. 13 is a front view of a support strip prior to use.
Figure 14:
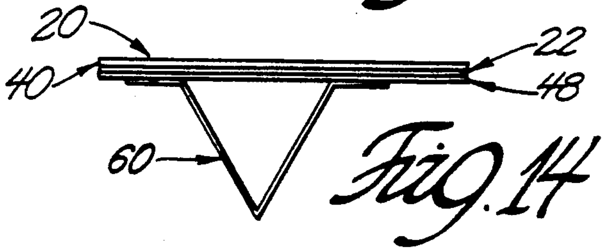
FIG. 14 is a fragmentary top view taken substantially along line 14—14 of FIG. 12.
Figure 8:
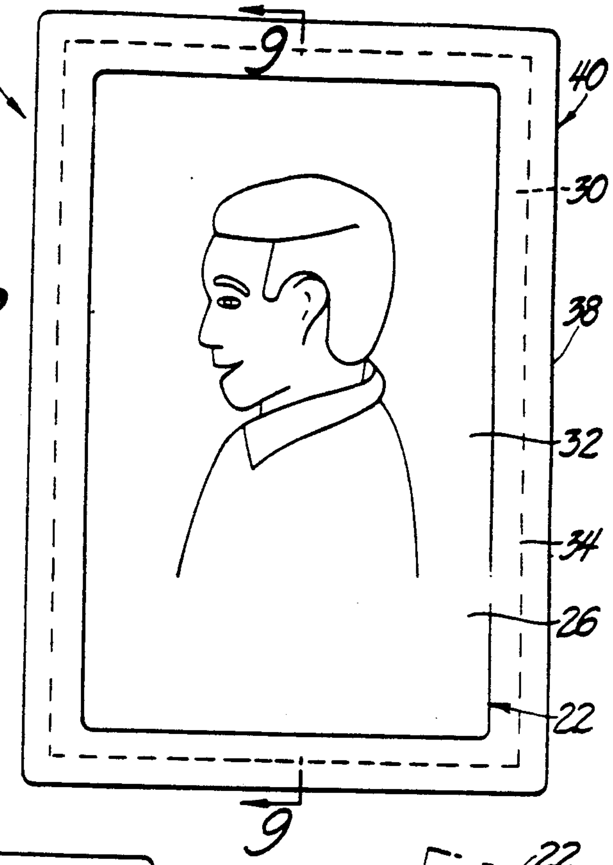
FIG. 8 is a front view of a photograph frame assembly according to the instant invention after assembly.
Figure 11:
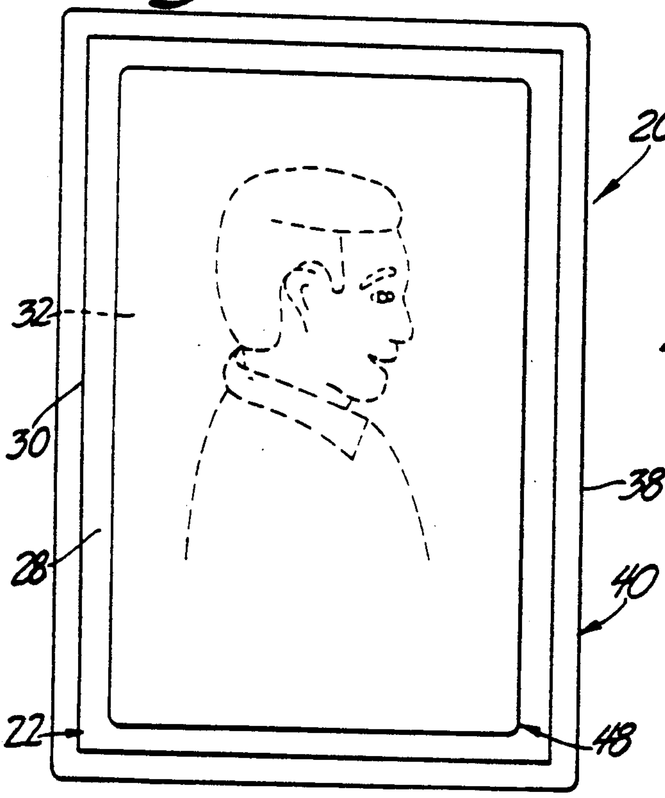
FIG. 11 is a rear view taken substantially along line 11—11 of FIG. 9.
Figure 12:
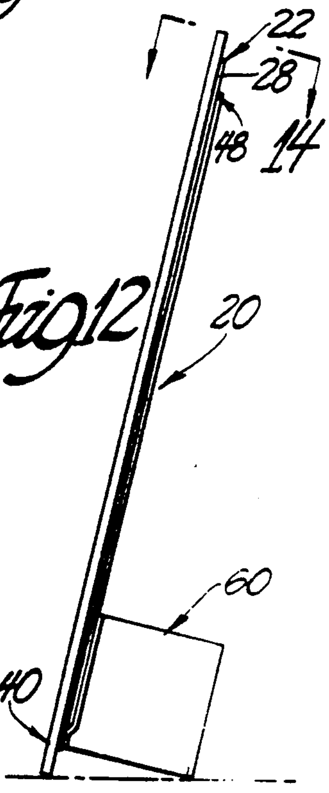
FIG. 12 is a side view of the photograph support assembly supported in an inclined upright position by a support strip.

In a preferred embodiment, a support strip such as that disclosed in U.S. Pat. No. 5,092,555 and shown in FIGS. 12, 13 and 14 can be used to maintain the photograph frame assembly 20 in an erect position.

In an alternative embodiment, not shown, there is no second die cut 57, such that when the center section 48 is removed the entire backing sheet 52 is removed. This allows the exposure of all of the border adhesive 46 such that a larger area of adhesive is available to bind to the photograph.

In the method of fabricating a photograph frame assembly 20, a frame sheet 24 including a border section 40 surrounding a center section 48 are fabricated from cellulose fiber. A back surface 36 of the center section 48 and the border section 40 of the frame sheet 24 are covered with adhesive. A single removable backing sheet 52 is placed over the center adhesive 50 disposed on the back surface 36 of the center section 48 and the border adhesive 46 disposed on the back surface 36 of the border section 40. Die cuts are made to allow removal of the center section 48 from the frame sheet 24 along the boundary of the border section 40 with the center section 48. Further die cuts are made to allow removal of a middle portion **52*a* of the removable backing sheet 52 with the center section thereby exposing an inner margin 42 on the back surface 36 of the border section 40**.

In the method of assembly, the center section 48 is removed from the frame sheet 24 with the middle portion **52*a* of the removable backing sheet 52 in place and thereby only exposing the border adhesive 46 disposed on the inner margin 42. The removal of the center section 48 from within the border section 40 forms a viewing region 56 within the border section 40. A photograph pictorial face 26 is positioned adjacent to the back surface 36 of the border section 40 with the central viewing area 32 visible in the viewing region 56. A margin 30 surrounding the central viewing area 32 of the photograph 22 is secured to the border adhesive 46 disposed on the back surface 36 of the border section 40. The middle portion 52*a* of the removable backing sheet 52 is removed from the back surface 36 of the center section 48 exposing the center adhesive 50. The center adhesive 50 is placed adjacent to the rear surface 28 of the photograph 22 thereby securing the center section 48 to the rear surface 28 of the photograph 22. Securing the center section 48 on the rear surface 28 of the photograph 22 maintains the photograph 22** rigid enough to be displayed in an erect position.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method of fabricating a photograph frame assembly (20) comprising the steps of:

removing a center section (48) from within a border section (40) of a frame sheet to form a viewing region (56) within the border section (40), positioning a photograph (22) adjacent to a back surface (36) of the border section (40) and in the viewing region (56), securing a margin (30) of the photograph (22) to the back surface (36) of the border section (40), and securing the back surface of the center section (48) on the rear surface (28) of the photograph (22) to maintain the photograph (22) rigid enough to be displayed in an erect position.

2. A method as set forth in claim 1 further characterized by covering the back surface of the center section (48) and back surface of the border section (40) with adhesive (46,50).

3. A method as set forth in claim 2 further characterized by placing a single removable backing sheet (52) over the adhesive (50) disposed on the back surface (36) of the center section (48) and the adhesive (46) disposed on the back surface (36) of the border section (40).

4. A method as set forth in claim 3 further characterized by die cutting to allow removal of the center section (48) from the frame sheet (24).

5. A method as set forth in claim 4 further characterized by die cutting to allow removal of a middle portion (52*a*) of the removable backing sheet (52) larger than the center section (48) thereby forming an inner margin (42) on the back surface (36) of the border section (40).

6. A method as set forth in claim 5 further characterized by removing the center section (48) from the frame sheet (24) with the middle portion (52*a*) of the removable backing sheet (52) in place and thereby only exposing the border adhesive (46) disposed on the inner margin (42).

7. A method as set forth in claim 6 further characterized by removing the middle portion (52*a*) of the removable backing sheet (52) from the center section (48) and securing the center section (48) to the rear surface (28) of the photograph (22).

8. A method as set forth in claim 7 further characterized by forming the photograph frame assembly (20) from cellulose fiber and subsequently overlaminating with a polypropylene laminate.

* * * * *